(12) United States Patent
Sun et al.

(10) Patent No.: US 10,948,749 B2
(45) Date of Patent: Mar. 16, 2021

(54) DISPLAY PANEL, DISPLAY TEST APPARATUS AND METHOD OF TESTING DISPLAY PANEL

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Shicheng Sun, Beijing (CN); Jianfei Tian, Beijing (CN); Zhiqiang Wang, Beijing (CN); Shuang Hu, Beijing (CN); Peirong Huo, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 140 days.

(21) Appl. No.: 16/115,498

(22) Filed: Aug. 28, 2018

(65) Prior Publication Data

US 2019/0285917 A1  Sep. 19, 2019

(30) Foreign Application Priority Data

Mar. 15, 2018 (CN) .......................... 201810215641.7

(51) Int. Cl.
  *G02F 1/13* (2006.01)
  *G02F 1/133* (2006.01)
  (Continued)

(52) U.S. Cl.
  CPC .......... *G02F 1/1309* (2013.01); *G02F 1/1343* (2013.01); *G02F 1/13306* (2013.01); *G02F 1/133345* (2013.01); *G02F 1/133514* (2013.01)

(58) Field of Classification Search
  CPC .. G02F 1/1339; G02F 1/1368; G02F 1/13458; G02F 2201/123; G02F 1/13452;
  (Continued)

(56) References Cited

U.S. PATENT DOCUMENTS 7,298,165 B2 * 11/2007 Chang ............... G02F 1/136204
                                                    324/760.02
7,365,562 B2 *  4/2008 Jeon ...................... G06F 3/0414
                                                    324/760.01
(Continued)

FOREIGN PATENT DOCUMENTS

CN    104217668 A    12/2014
CN    104217672 A    12/2014
(Continued)

OTHER PUBLICATIONS

First Chinese Office Action dated Sep. 22, 2020, received for corresponding Chinese Application 201810215641.7, 15 pages.
(Continued)

*Primary Examiner* — Vinh P Nguyen
(74) *Attorney, Agent, or Firm* — Kinney & Lange, P.A.

(57) ABSTRACT

A display panel and a display test apparatus and a method of testing the display panel are provided. The display panel includes an array substrate; a test device disposed on the array substrate and configured to receive a test signal from a display test apparatus to test a plurality of pixel units of the display panel; and a connection device disposed on the array substrate and configured to be electrically connectable to the display test apparatus electrically, the test device receives a discharge signal from the display test apparatus to discharge the plurality of pixel units in response to a switch of a connection state between the connection device and the display test apparatus from electrical connection to electrical disconnection.

5 Claims, 7 Drawing Sheets

(51) Int. Cl.
*G02F 1/1333* (2006.01)
*G02F 1/1335* (2006.01)
*G02F 1/1343* (2006.01)

(58) Field of Classification Search
CPC ... G02F 1/133514; G02F 2001/136254; G02F 1/1309; G02F 1/13306; G02F 1/133345; G02F 1/1343; G02F 1/133512; H01L 2224/0384; H01L 51/5246; H01L 24/73; H01L 51/56; H01L 24/08; H01L 27/3276; H01L 2224/16105; H01L 2224/32155; H01L 2924/01047; H01L 2224/16505; H01L 2224/73203; H01L 2224/08057; H01L 2224/03019; H01L 2224/32105; H01L 2224/16155; H01L 27/1218; H01L 24/03; H01L 24/16; H01L 27/3244; H01L 27/124; H01L 24/32; G09G 3/006; G09G 2300/0426; G09G 2300/0439; G09G 2300/0842

See application file for complete search history.

(56) References Cited

U.S. PATENT DOCUMENTS

| | | | |
|---|---|---|---|
| 8,188,481 B2 * | 5/2012 | Yanagisawa | H01L 27/1214 |
| | | | 257/72 |
| 8,854,590 B2 * | 10/2014 | Ochiai | H01L 24/05 |
| | | | 349/151 |
| 9,595,213 B2 * | 3/2017 | Kim | G09G 3/3225 |
| 9,608,125 B2 * | 3/2017 | Cai | G09G 3/006 |
| 10,209,272 B2 | 2/2019 | Li et al. | |
| 2005/0083073 A1 | 4/2005 | Nihei et al. | |
| 2014/0354286 A1 | 12/2014 | Kim | |
| 2016/0047857 A1 | 2/2016 | Lee | |
| 2017/0019035 A1 | 1/2017 | Matsumoto et al. | |

FOREIGN PATENT DOCUMENTS

| | | |
|---|---|---|
| CN | 105403826 A | 3/2016 |
| CN | 106154095 A | 11/2016 |
| JP | 2002014131 A | 1/2002 |
| JP | 2010205966 A | 9/2010 |

OTHER PUBLICATIONS

Second Office Action dated Jan. 28, 2021, for corresponding Chinese Application No. 201810215641.7.

* cited by examiner

FIG.11

DISPLAY PANEL, DISPLAY TEST APPARATUS AND METHOD OF TESTING DISPLAY PANEL

CROSS-REFERENCE TO RELATED APPLICATION

This application claims priority to Chinese Patent Application No. 201810215461.7 filed on Mar. 15, 2018 in the State Intellectual Property Office of China, the disclosure of which is hereby incorporated by reference in its entirety.

TECHNICAL FIELD

The present disclosure relates to the field of display technologies, and in particular, to a display panel and a display test apparatus and a method of testing the display panel.

BACKGROUND

A liquid crystal display (abbreviated as LCD) has the advantages of low radiation, small size and low energy consumption, and is widely used in electronic products such as notebook computers, flat-panel televisions or mobile phones.

SUMMARY

An embodiment of the present disclosure provides a display panel comprising: an array substrate; a test device disposed on the array substrate and configured to receive a test signal from a display test apparatus to test a plurality of pixel units of the display panel; and a connection device disposed on the array substrate and configured to be electrically connectable to the display test apparatus electrically, wherein the test device receives a discharge signal from the display test apparatus to discharge the plurality of pixel units in response to a switch of a connection state between the connection device and the display test apparatus from electrical connection to electrical disconnection.

In some embodiments, the connection device comprises: a first connection pad configured to receive a connection state detection signal from the display test apparatus; a second connection pad configured to transmit a feedback signal based on the connection state detection signal to the display test apparatus; and a conductive member electrically coupling the first connection pad to the second connection pad.

In some embodiments, the array substrate comprises: a base substrate; a first insulating layer on the base substrate; a first conductive layer on the first insulating layer; and a second insulating layer on the first conductive layer, the second insulating layer having a first opening and a second opening exposing the first conductive layer, wherein the first connection pad is located on the second insulation layer and connected to the first conductive layer via the first opening, and the second connection pad is located on the second insulation layer and connected to the first conductive layer via the second opening, and wherein the conductive member comprises a portion of the first conductive layer between the first connection pad and the second connection pad.

In some embodiments, the test device comprises: a first test pad, a second test pad, a third test pad, and a fourth test pad; and wherein the array substrate comprises: a plurality of pixel electrodes arranged in an array and located in the plurality of pixel units respectively; a plurality of pixel driving transistors in one-to-one correspondence with the plurality of pixel electrodes, a first electrode of each of the pixel driving transistors being electrically connected to one pixel electrode; a plurality of scanning signal lines, each of the scanning signal lines being electrically connected to a plurality of control electrodes of the pixel driving transistors for one row of pixel electrodes; a plurality of data signal lines, each of the data signal lines being connected to a plurality of second electrodes of the pixel driving transistors for one column of pixel electrodes; a plurality of first transistors in one-to-one correspondence with the plurality of scanning signal lines, each of control electrodes of the first transistors being connected to the first test pad, and each of first electrodes of the first transistors being connected to the second test pad, and each of second electrodes of the first transistors being connected to one scanning signal line; and a plurality of second transistors in one-to-one correspondence with the plurality of data signal lines, each of control electrodes of the second transistors being connected to the third test pad, and each of first electrodes of the second transistors being connected to the fourth test pad, and each of second electrodes of the second transistors being connected to one data signal line.

In some embodiments, in response to the switch of the connection state between the connection device and the display test apparatus from electrical connection to electrical disconnection, the discharge signal sets the first test pad, the second test pad, and the third test pad to a first level so that the first transistors, the second transistors, and the pixel driving transistors are all in an on state, and the discharge signal sets the fourth test pad to a discharge level to provide the discharge level to the plurality of pixel electrodes.

In some embodiments, at least one of the first connection pad and the second connection pad serves as an alignment mark of the array substrate.

An embodiment of the present disclosure provides a display test apparatus comprising a test head, wherein the test head comprises: a test probe configured to provide a test signal to a display panel under test; and a connection probe configured to transmit a connection state detection signal to the display panel under test, and receiving a feedback signal based on the connection state detection signal from the display panel under test, wherein the test probe provides a discharge signal to the display panel under test in response to a switch of a connection state between the connection probe and the display panel under test from electrical connection to electrical disconnection.

In some embodiments, a length of a portion of the connection probe protruding from a surface of the test head is less than a length of a portion of the test probe protruding from the surface of the test head.

In some embodiments, the test probe is compressible in a protruding direction so that the connection probe and the test probe are electrically connectable to the display panel under test simultaneously.

In some embodiments, the display test apparatus further comprises: a limiting member for fixing the test head to a first position or a second position, wherein the connection probe and the test probe are electrically connected to the display panel under test in response to the test head being located in the first position, the connection probe and the test probe are both separated from the display panel under test in response to the test head being located in the second position, and the connection probe is separated from the display panel under test and the test probe is electrically connected to the display panel under test in response to the test head being located between the first position and the second position.

In some embodiments, the display test apparatus further comprises a damping member, wherein the damping member is configured to provide damping for a movement of the test head from the first position to the second position.

In some embodiments, the display test apparatus further comprises a wheel, wherein the test head is attached to a circumferential surface of the wheel, and the wheel is rotatable to move the test head between the first position and the second position.

In some embodiments, the limiting member comprises a stopper, a first groove and a second groove, the first groove and the second groove being provided in the circumferential surface of the wheel, and wherein the first groove is engageable with the stopper so that the test head is located in the first position, and the second groove is engageable with the stopper so that the test head is located in the second position.

An embodiment of the present disclosure provides a method of testing a display panel using the display test apparatus according to the above embodiments, wherein the display panel comprises an array substrate, a connection device and a test device, the connection device and the test device being disposed on the array substrate, the method comprises: providing the connection state detection signal to the connection device of the display panel via the connection probe of the display test apparatus; judging whether the connection probe receives the feedback signal based on the connection state detection signal from the connection device or not; providing the test signal to the test device of the display panel via the test probe of the display test apparatus to test the display panel in response to a state that the connection probe receives the feedback signal; and providing the discharge signal to the test device of the display panel via the test probe of the display test apparatus to discharge the display panel in response to a state that the connection probe does not receive the feedback signal.

In some embodiments, the test device comprises: a first test pad, a second test pad, a third test pad, and a fourth test pad, and wherein the array substrate comprises: a plurality of pixel electrodes arranged in an array and in one-to-one correspondence with a plurality of pixel units; a plurality of pixel driving transistors in one-to-one correspondence with the plurality of pixel electrodes, a first electrode of each of the pixel driving transistors being electrically connected to one pixel electrode; a plurality of scanning signal lines, each of the scanning signal lines being electrically connected to a plurality of control electrodes of the pixel driving transistors for one row of pixel electrodes; a plurality of data signal lines, each of the data signal lines being connected to a plurality of second electrodes of the pixel driving transistors for one column of pixel electrodes; a plurality of first transistors in one-to-one correspondence with the plurality of scanning signal lines, each of control electrodes of the first transistors being connected to the first test pad, each of first electrodes of the first transistors being connected to the second test pad, and each of second electrodes of the first transistors being connected to one scanning signal line; and a plurality of second transistors in one-to-one correspondence with the plurality of data signal lines, each of control electrodes of the second transistors being connected to the third test pad, each of first electrodes of the second transistors being connected to the fourth test pad, and each of second electrodes of the second transistors being connected to one data signal line, wherein providing the discharge signal to the test device of the display panel via the test probe of the display test apparatus to discharge the display panel comprises: providing the discharge signal to set the first test pad, the second test pad, and the third test pad to a first level so as to make the first transistors, the second transistors, and the pixel driving transistors be in an on state; and providing the discharge signal to set the fourth test pad to a discharge level so as to provide the discharge level to the plurality of pixel electrodes and discharge the display panel.

BRIEF DESCRIPTION OF THE DRAWINGS

In order to more clearly illustrate the technical solutions of the present disclosure, the drawings of the embodiments will be briefly described below. It should be understood that the drawings described below are only a few of the embodiments of the disclosure, and are not intended to limit the present disclosure.

DETAILED DESCRIPTION OF THE EMBODIMENTS

In order to make the purpose, technical solutions and advantages of the embodiments of the present disclosure clear, the technical solutions of the embodiments of the present disclosure will be clearly and completely described below in conjunction with the accompanying drawings. It is apparent that the described embodiments are only a part of the embodiments of the present disclosure, but not all of the embodiments. Based on the described embodiments, all other embodiments obtained by those of ordinary skill in the art without the need for inventive work are also within the scope of the present disclosure.

In the description of the present disclosure, "a plurality" means two or more unless otherwise stated. The orientation or positional relationship of the terms "on", "below", "left", "right", "inside", "outside" and the like is based on the orientation or positional relationship shown in the drawings. It is only for the convenience of describing the present disclosure, and for simplifying the description, and not to indicate or imply that the machine or component referred to must have a particular orientation, constructed and operated in a particular orientation. Thus it is not to be construed as limiting the disclosure.

In the description of the present disclosure, unless otherwise expressly stated and limited, it should be noted that the terms "mounted", "connected", and "coupled" are to be understood broadly, and may be, for example, a fixed connection, a detachable connection, or an integral connection; either a mechanical connection or an electrical connection; either a direct connection, or indirect connection through an intermediate medium. For those skilled in the art, the specific meanings of the above terms in the present disclosure may be understood in the specific circumstances.

The specific embodiments of the present disclosure are further described in detail below with reference to the accompanying drawings and embodiments. The following embodiments are intended to illustrate the disclosure, but are not intended to limit the scope of the disclosure.

The liquid crystal display (LCD) includes a polysilicon (Poly-Si) LCD and an amorphous silicon (a-Si) LCD, the two LCDs being mainly different in transistor characteristics. The polysilicon LCD may include a low temperature polysilicon thin film transistor (LTPS-TFT) LCD and a high temperature polysilicon thin film transistor (HTPS-TFT) LCD. The LTPS-TFT LCD has the advantages of high resolution, fast response, high brightness, and high aperture ratio and the like. Since the silicon crystal arrangement of the LTPS-TFT LCD is more orderly than that of the a-Si LCD, the electron mobility of the LTPS-TFT LCD is relatively 100 times higher than that of the a-Si LCD.

In a process of manufacturing the liquid crystal display, a liquid crystal panel needs to be tested. For example, a liquid crystal cell that has been cut is tested by a display test apparatus to determine whether the liquid crystal cell has a defect or not, and such a test may be called a Cell Test. The Cell Test is performed before a driver chip and a flexible circuit board for inputting display signals are not mounted on the liquid crystal panel. Specifically, in the Cell Test, a test signal is firstly input to the liquid crystal panel to make pixels thereof appear color, and then each pixel is observed one by one through the defect test apparatus to determine whether the pixels are good or not. This process may also be called a Light-on Test.

In the case where the display panel is suddenly powered down, since a leakage current of the transistor is large for the a-Si LCD, the residual charges in the pixel can usually be released by the leakage current when the display panel is powered down. However, since a leakage current of the transistor is small for the LTPS-TFT LCD, the residual charges in the pixel may be released at a slow rate. Therefore, when the display panel is suddenly powered down, the residual charges in the pixel of the LTPS display panel may not be effectively and quickly released. If the residual charges are not quickly released, the residual charges will remain inside each pixel. The residual charges accumulate and will form a polar electric field, which may cause adverse effects such as a ghost image and grayscale flicker on the display panel.

Figure 1:
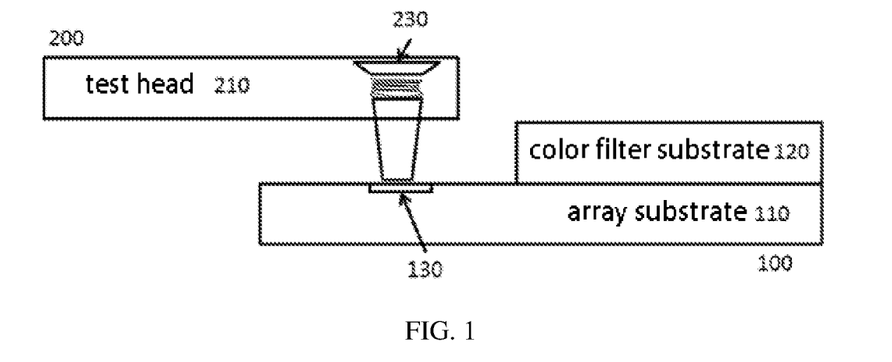
FIG. 1 is a schematic view showing a display panel is tested by using a display test apparatus in related art.

FIG. 1 is a schematic view showing a display panel that is tested by using a display test apparatus in related art. A display panel 100 includes an array substrate 110, a color filter substrate 120, and a test pad 130 located on the array substrate 110. A display test apparatus 200 includes a test head 210 having a test probe 230 disposed at one end thereof. During the test, the test probe 230 of the display test apparatus 200 is electrically coupled to the test pad 130 on the array substrate to provide a test signal to the display panel 100 and to test the display panel. However, after the test is completed, the test signal is stopped, and when the test head 210 of the test apparatus 200 is raised to cause the test probe 230 to be separated from the test pad 130, the display panel 100 is powered down. When the display panel 100 is suddenly powered down, it is difficult for the residual charges in the pixel to be released, resulting in defects such as a ghost image, grayscale flicker, and the like.

Embodiments of the present disclosure provide a display panel, a display test apparatus and a method of testing the display panel. After the display panel is tested by the display test apparatus, a discharge circuit may be started to release the residual charges in the pixels of the display panel before the display test apparatus and the display panel are completely separated from each other.

Figure 2:
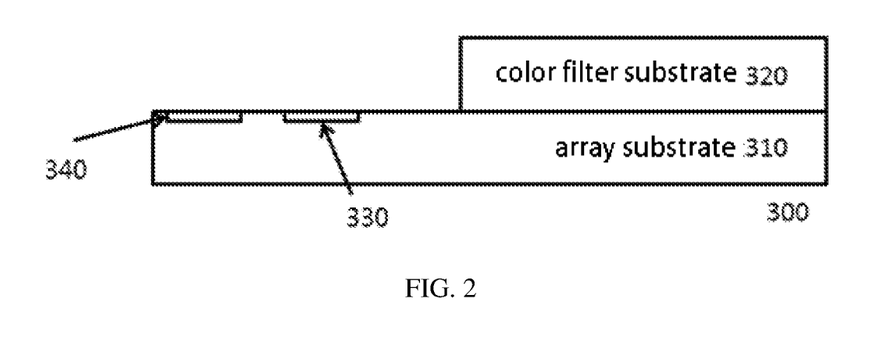
FIG. 2 is a schematic structural view of a display panel according to an embodiment of the present disclosure.

FIG. 2 is a schematic structural view of a display panel according to an embodiment of the present disclosure. As shown in FIG. 2, a display panel 300 includes an array substrate 310, a color filter substrate 320, and a test device 330 and a connection device 340 located on the array substrate 310. It is to be understood that FIG. 2 only schematically shows the test device 330 and the connection device 340, and the numbers thereof are not specifically limited.

In some embodiments of the present disclosure, a display test apparatus tests pixel units of the display panel 300 via the test device 330, such as by providing a test signal to the array substrate 310. Further, the connection device 340 may detect a connection state between the display test apparatus and the array substrate 310 when the display panel 300 is tested. The specific connection relationship between the display test apparatus and the display panel will be described in detail below.

Figure 3:
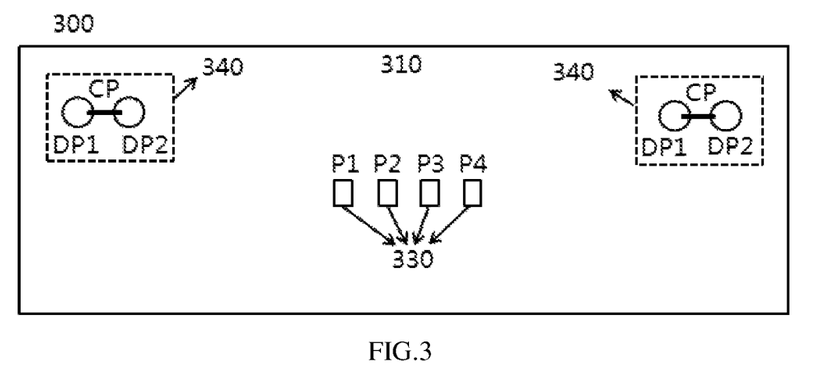
FIG. 3 is a schematic plan view of a portion of an array substrate of a display panel according to an embodiment of the present disclosure.

FIG. 3 is a schematic plan view of a portion of an array substrate of a display panel according to an embodiment of the present disclosure, in which configurations of the test device 330 and the connection device 340 are further illustrated. As shown in FIG. 3, the display panel 300 includes the array substrate 310, and the test device 330 and the connection device 340 are located on the array substrate 310. It will be appreciated that FIG. 3 only schematically illustrates that the connection device 340 includes two connection pads and the test device 330 includes four test pads.

As shown in FIG. 3, the connection device 340 may include a first connection pad DP1, a second connection pad DP2, and a conductive member CP that electrically couples the first connection pad DP1 to the second connection pad DP2. Therefore, there is a conductive path between the first connection pad DP1 and the second connection pad DP2. The first connection pad DP1 may receive a connection state detection signal from the display test apparatus, and the second connection pad DP2 may transmit a feedback signal based on the connection state detection signal to the display test apparatus. When the first connection pad DP1 receives the connection state detection signal from the display test apparatus and the display test apparatus receives the feedback signal from the second connection pad DP2, it may be determined that the display test apparatus is in a connected state with the array substrate. After the display panel has been tested in the connected state, when the first connection pad DP1 does not receive the connection state detection signal from the display test apparatus and the display test apparatus does not receive the feedback signal from the second connection pad DP2, it is thus determined that the display test apparatus and the array substrate are about to be separated from each other, and the display panel is about to be powered down.

Figure 4:
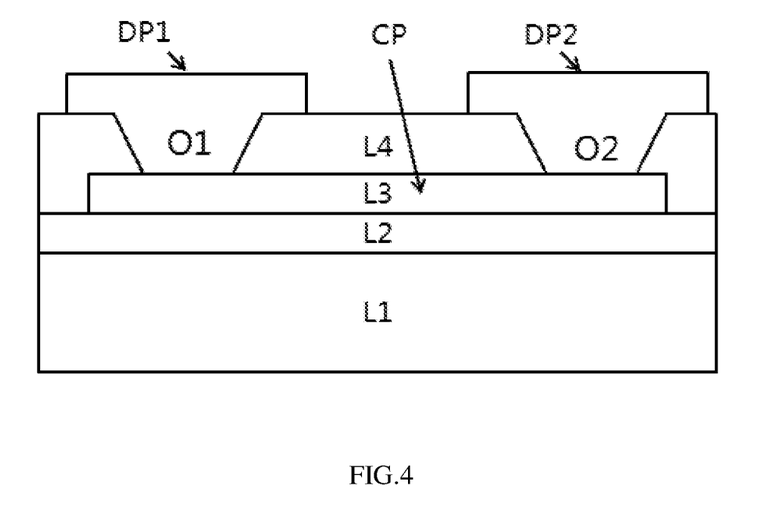
FIG. 4 is a schematic cross-sectional view of a portion of an array substrate of a display panel according to an embodiment of the present disclosure.

FIG. 4 is a schematic cross-sectional view of a portion of an array substrate of a display panel according to an embodiment of the present disclosure. A structure of the connection device 340 is further illustrated. As shown in FIG. 4, the array substrate 310 of the display panel 300 includes: a base substrate L1, a first insulating layer L2 on the base substrate, a first conductive layer L3 on the first insulating layer, and a second insulating layer L4 on the first conductive layer. The second insulating layer L4 is provided with a first opening O1 and a second opening O2 exposing the first conductive layer L3. The first connection pad DP1 is located on the second insulation layer L4 and connected to the first conductive layer L3 via the first opening O1, and the second connection pad DP2 is located on the second insulation layer L4 and connected to the first conductive layer L3 via the second opening O2. A portion of the first conductive layer L3 between the first connection pad DP1 and the second connection pad DP2 serves as the conductive member CP.

In some embodiments of the present disclosure, the base substrate L1 may be a glass substrate. The first insulating layer L2 may be made of an insulating material such as SiN, SiO, or the like. The first conductive layer L3 may be made of a metal material such as a three-layer structure of Ti, Al and Ti. The second insulating layer L4 may be made of an organic resin material.

In some embodiments of the present disclosure, the first connection pad DP1 and/or the second connection pad DP2 may also be used as an alignment mark of the array substrate 310 for alignment in a subsequent process. Thus, the introduction of the connection device 340 does not occupy an additional area of array substrate.

In some embodiments of the present disclosure, as shown in FIG. 3, the test device 330 may include a first test pad P1, a second test pad P2, a third test pad P3, and a fourth test pad P4. The first test pad P1 receives a first signal S1, the second test pad P2 receives a second signal S2, the third test pad P3 receives a third signal S3, and the fourth test pad P4 receives a fourth signal S4. During the test, the first test pad P1, the second test pad P2, the third test pad P3, and the fourth test pad P4 receive the test signal provided by the display test apparatus. The first test pad P1, the second test pad P2, the third test pad P3, and the fourth test pad P4 receive a discharge signal provided by the display test apparatus when the display panel is about to be powered down.

Figure 5:
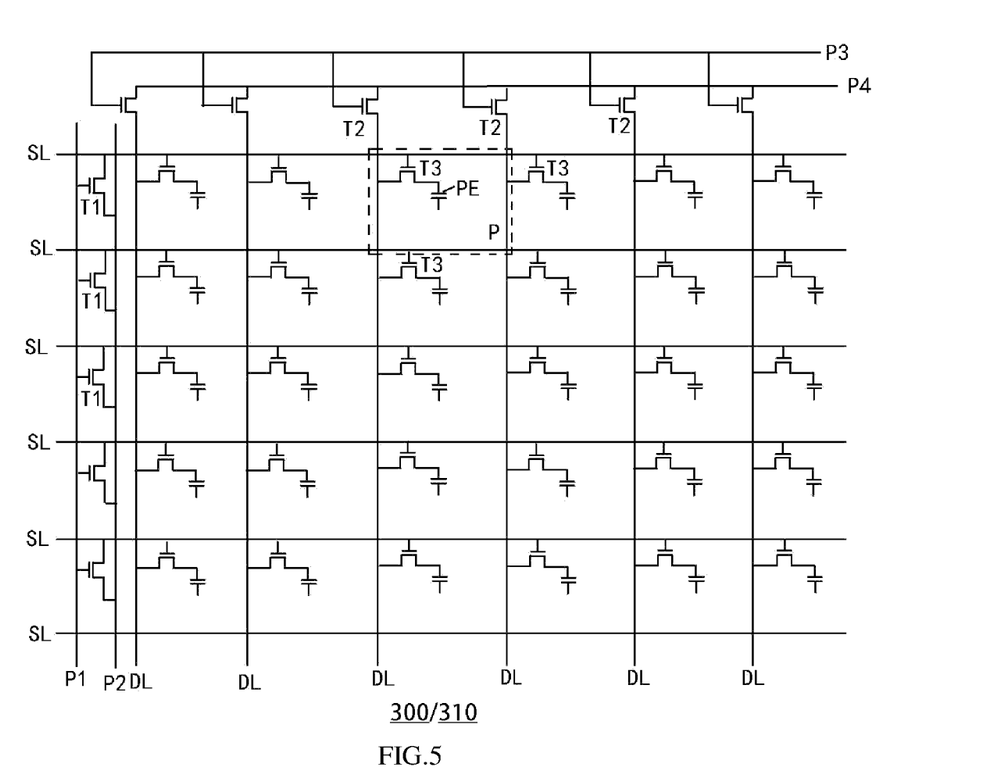
FIG. 5 is a schematic view of a circuit of a display panel according to an embodiment of the present disclosure.

FIG. 5 is a schematic view of a circuit of a display panel according to an embodiment of the present disclosure. As shown in FIG. 5, the array substrate 310 of the display panel 300 includes a plurality of scan lines SL and a plurality of data lines DL, and the plurality of scan lines SL and the plurality of data lines DL cross with each other, for example, are perpendicular to each other. The plurality of scan lines SL and the plurality of data lines DL define a plurality of pixel units P of the display panel arranged in an array. Each of the pixel units P includes a pixel electrode PE and a pixel driving transistor T3. A first electrode of the pixel driving transistor T3, such as a drain electrode or a source electrode, is electrically connected to the pixel electrode PE for providing a pixel level to the pixel electrode PE. In one embodiment, a plurality of pixel electrodes PE are arranged in an array on the array substrate 310, and controllable voltages are generated between the pixel electrodes PE and a common electrode having a common voltage Vcom located on the color filter substrate to control the twist of the liquid crystal molecules, thereby realizing display. As shown in FIG. 5, each of the scanning signal lines SL is electrically connected to a control electrode of the pixel driving transistor T3 of each pixel unit in one pixel unit row, and each of the data signal lines DL is electrically connected to a second electrode, such as a source electrode or a drain electrode, of the pixel driving transistor T3 of each pixel unit in one pixel unit column. The array substrate 110 further includes a plurality of first transistors T1 and a plurality of second transistors T2. The plurality of first transistors T1 are in one-to-one correspondence with the plurality of scanning signal lines SL, and a control electrode of each of the first transistors T1 is connected to the first test pad P1, and a first electrode of each of the first transistors, such as a drain electrode or the source electrode, is electrically connected to the second test pad P2, and a second electrode of each of the first transistors, such as the source electrode or the drain electrode, is electrically connected to one scanning signal line SL. The plurality of second transistors T2 are in one-to-one correspondence with the plurality of data signal lines DL, a control electrode of each of the second transistors T2 is electrically connected to the third test pad P3, and a first electrode of each of the second transistors T2 is electrically connected to the fourth test pad P4, a second electrode of each of the second transistors T2 is electrically connected to one data signal line DL.

Figure 6:
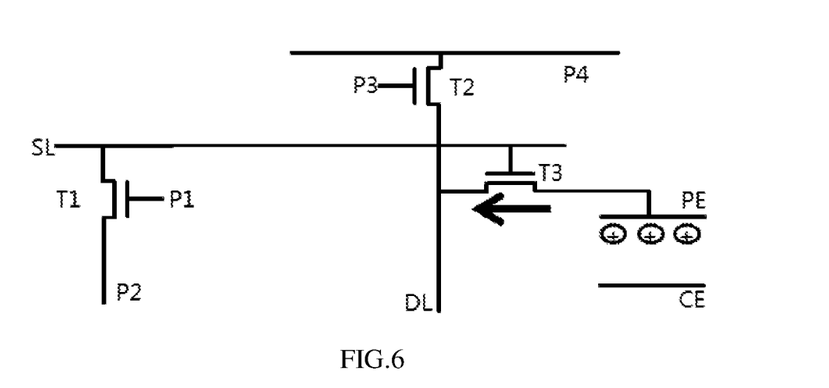
FIG. 6 is a schematic view of a discharge circuit of a pixel unit according to an embodiment of the present disclosure.

In some embodiments, in response to a switch of the connection state between the connection device 340 of the array substrate 110 and the display test apparatus from electrical connection to electrical disconnection, the discharge signal is provided by the display test apparatus to set the first test pad P1 and the second test pad P2 and the third test pad P3 to a first level, such as a high level, such that the plurality of first transistors T1, the plurality of second transistors T2, and the plurality of pixel driving transistors T3 on the array substrate are all in an on state. The discharge signal sets the fourth test pad P4 to a discharge level, for example, zero level, i.e. ground. In this manner, a plurality of pixel units may be simultaneously discharged. FIG. 6 is a schematic view of a discharge circuit of a pixel unit according to an embodiment of the present disclosure. A discharge process of the discharge circuit will be specifically described below with reference to FIG. 6. As shown in FIG. 6, the discharge circuit includes a first transistor T1, a second transistor T2, and a pixel driving transistor T3. In some embodiments of the present disclosure, the first transistor T1, the second transistor T2, and the pixel driving transistor T3 are all N-type field effect transistors, such as NMOS-FETs. The gate electrode of the NMOS-FET acts as a control electrode. Since the source electrode and drain electrode of the NMOS-FET are symmetrical, no specific distinction may be made. For example, the first electrode of the NMOS-FET may represent the drain electrode (or the source electrode) while the second electrode of the NMOS-FET may represent the source electrode (or the drain electrode). It can be understood that in other embodiments, P-type field effect transistors (PMOS) such as PMOS-FETs may also be used as the first transistor T1, the second transistor T2, and the pixel driving transistor T3.

As shown in FIG. 6, the control electrode of the first transistor T1 is configured to connect with the first test pad P1 to receive the first signal S1, and the first electrode of the first transistor T1 is configured to connect with the second test pad P2 to receive the second signal S2. The second electrode of the first transistor T1 is configured to connect with the scanning signal line SL. The control electrode of the second transistor T2 is configured to connect with the third test pad P3 to receive the third signal S3, the first electrode of the second transistor T2 is configured to connect with the fourth test pad P4 to receive the fourth signal S4, and the second electrode of the second transistor T2 is configured to connect with the data signal line DL. The control electrode of the pixel driving transistor T3 is configured to connect the scanning signal line SL, the first electrode of the pixel driving transistor T3 is configured to connect the pixel electrode PE of the pixel unit, and the second electrode of the pixel driving transistor T3 is configured to connect the data signal line DL. As shown in FIG. 6, the pixel electrode PE and the common electrode CE are oppositely disposed, after the display panel has been tested, the test signal is stopped such that the residual charges are accumulated on the pixel electrode PE of the pixel unit of the display panel.

In some embodiments of the present disclosure, in response to the switch of the connection state between the connection device 340 of the array substrate 310 and the display test apparatus from electrical connection to electrical disconnection, the discharge signal is provided by the display test apparatus to set the first test pad P1, the second test pad P2 and the third test pad P3 to the first level, such as the high level, such that the plurality of first transistors, the plurality of second transistors, and the plurality of pixel driving transistors on the array substrate are all in an on state. The discharge signal sets the fourth test pad P4 to a discharge level, for example, zero level, i.e. ground. The first transistor T1 is turned on by the first signal S1, and the second signal S2 is supplied to the control electrode of the pixel driving transistor T3. The pixel driving transistor T3 is turned on by the second signal S2, and the second transistor T2 is turned on by the third signal S3. At this time, the pixel electrode PE receives the fourth signal S4, that is, the pixel electrode PE is grounded, and the charges accumulated on the electrode PE are released.

In some embodiments, the first signal S1 provided to the first test pad P1 and the second signal S2 provided to the second test pad P2 may be the same. In this case, the control electrode of the first transistor T1 and the first electrode of the first transistor T1 may be electrically connected with each other, and both of them may be connected to one test pad, thereby reducing the number of test pads in one test device and correspondingly reducing the number of corresponding test probes of the display test apparatus and reducing the cost.

The display panel provided by an embodiment of the present disclosure is capable of quickly detecting its separation from the display test apparatus, thereby facilitating subsequent processes, such as the discharge circuit is activated in time to discharge the residual charges in the pixel unit.

Figure 7:
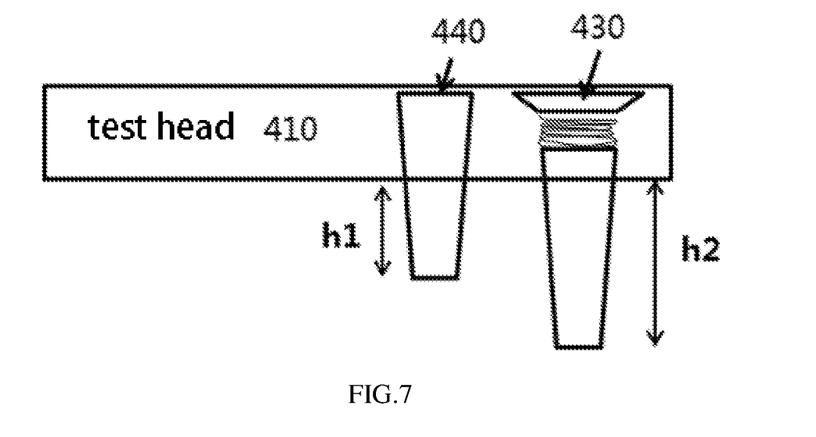
FIG. 7 is a schematic view of a test head of a display test apparatus according to an embodiment of the present disclosure.

FIG. 7 is a schematic view of a test head of a display test apparatus according to an embodiment of the present disclosure, the test head may be used for testing a display panel provided by an embodiment of the present disclosure. The display test apparatus includes a test head 410 providing with a connection probe 440 and a test probe 430. The connection probe 440 may be used to electrically connect to the connection device 340 of the display panel, and the test probe 430 may be used to electrically connect to the test device 330 of the display panel. It should be understood that FIG. 7 only schematically shows the connection probe 440 and the test probe 430, and the number thereof is not limited, and the number thereof may be set according to actual needs.

In some embodiments of the present disclosure, the connection probe 440 includes, for example, a first connection probe and a second connection probe. The first connection probe is connectable to the first connection pad DP1 to provide the connection state detection signal thereto. The second connection probe is connectable to the second connection pad DP2 to receive the feedback signal based on the connection state detection signal therefrom.

Further, as shown in FIG. 7, a length h1 of a portion of the connection probe 440 protruding from a surface of the test head 410 is smaller than a length h2 of the test probe 430 protruding from the surface of the test head 410. Moreover, the test probe 430 is compressible in the protruding direction such that the test probe 430 and the connection probe 440 may be simultaneously electrically connected to the test device 330 and the connection device 340, respectively.

Figure 8:
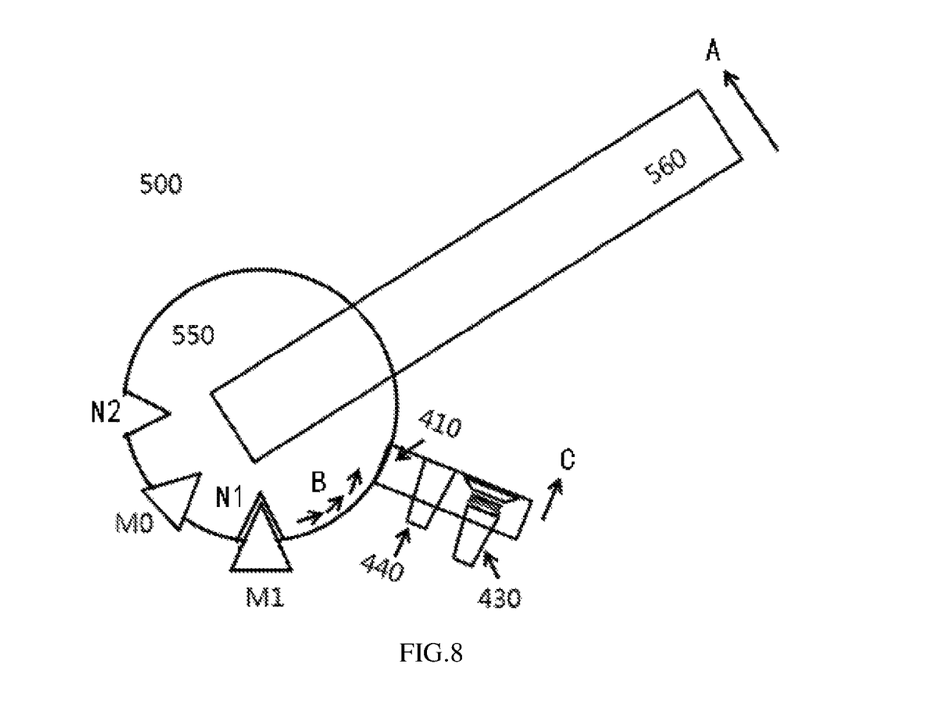
FIG. 8 is a schematic view of a display test apparatus according to an embodiment of the present disclosure.

FIG. 8 is a schematic view of a display test apparatus according to an embodiment of the present disclosure. The display test apparatus 500 includes a test head 410 including a connection probe 440 and a test probe 430, a wheel 550, and a lever 560. The test head 410, the connection probe 440, and the test probe 430 are identical in structure to those in FIG. 7. As shown in FIG. 8, the test head 410 can be attached to a circumferential surface of the wheel 550 such that a position of the test head 410 can be changed by rotating the wheel 550. For example, the wheel 550 may be rotated by pulling the lever 560.

As shown in FIG. 8, the display test apparatus 500 may further include a limiting member M1 that may fix the test head 410 to the first position or the second position. For example, the limiting member includes a stopper M1, and a first groove N1 and a second groove N2 which are disposed in the wheel 550. As shown in FIG. 8, when the stopper M1 is engaged with the first groove N1, the test head 410 is fixed into the first position. At the first position, the test probe 430 and the connecting probe 440 of the test head 410 are simultaneously electrically connected with the test device 330 and the connection device 340, respectively. The wheel 550 is rotatable, while the stopper M1 is fixed. For example, when the lever 560 moves in the A direction, the wheel 550 rotates in the B direction, and the test head 410 is lifted in the C direction. When the wheel 550 rotates until the stopper M1 is engaged with the second groove N2, the test head 410 is fixed to the second position, and at the second position, the test probe 430 and the connecting probe 440 of the test head 410 are disconnected from the test device 330 and the connection device 340, respectively. Moreover, the display test apparatus 500 may further include a damping member M0. The damping member M0 may provide damping during the test head 410 is switched from the first position to the second position. When the test head 410 is located between the first position and the second position, i.e. an intermediate position, the connection probe 440 is disconnected from the connection device 340, while the test probe 430 and the test device 330 remains electrically connected with each other. The damping component M0 provides an appropriate discharge time for the display panel. For example, it takes at least 50 ms for the test head 410 to be switched from the first position to the second position, which ensures that the pixel unit of the display panel is fully discharged. Further, the damping member may include a raised member that is in contact with the circumferential surface of the wheel 550. The raised member is for example telescopic or elastic. The above first position, second position and intermediate position will be specifically described in conjunction with FIG. 9A-9C.

Figure 9A:
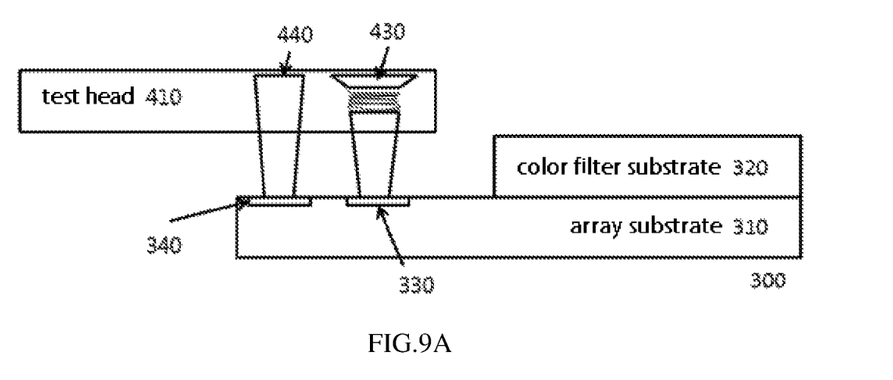
FIGS. 9A-9C are schematic views showing a display panel is tested by using a display test apparatus according to an embodiment of the present disclosure.
Figure 9B:
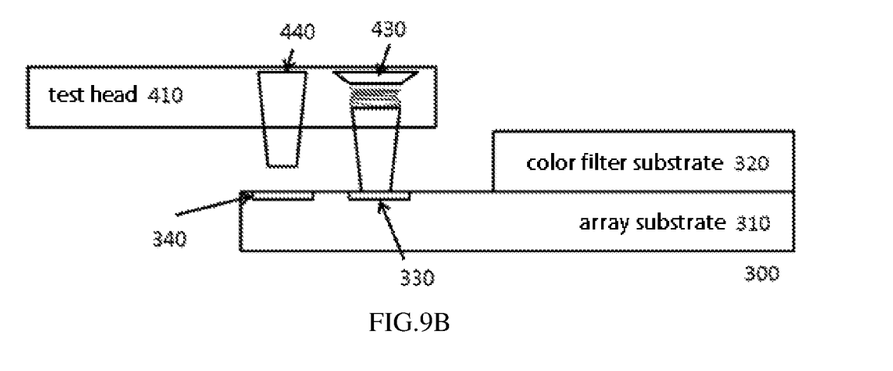
Figure 9C:
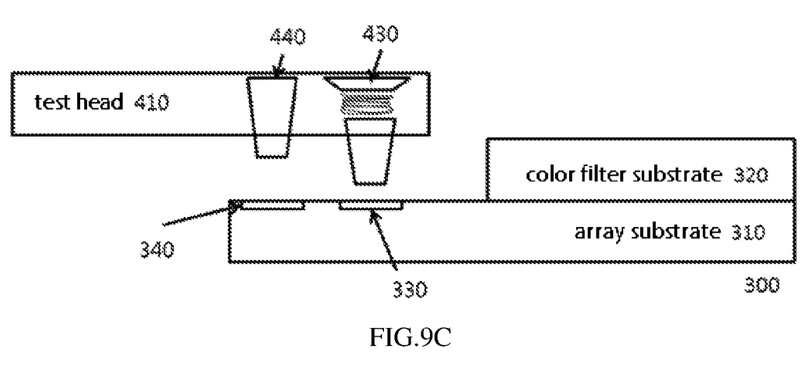

FIGS. 9A-9C are schematic views showing that a display panel is tested by using a display test apparatus according to an embodiment of the present disclosure. As shown in FIGS. 9A-9C, the display panel is, for example, the display panel 300 shown in FIG. 2, the display test apparatus is, for example, the display test apparatus 500 shown in FIG. 8, and only the test head 410 of display test apparatus 500 is shown in FIGS. 9A-9C.

As shown in FIG. 9A, the test head 410 is located in the first position when the test head 410 is fully depressed. At the first position, the connection probe 440 and the test probe 430 are both in contact with the display panel under test. That is, the connection device 340 on the array substrate 310 is in contact with the connection probe 440 of the test head 410 with a signal path therebetween, thereby determining that the display test apparatus 500 is in a connected state with the display panel 300. The test device 330 on the array substrate 310 is in contact with the test probe 430 of the test head 410 of the display test apparatus 500 so that the pixel units of the display panel 300 may be tested by the display test apparatus 500, for example, by providing the test signal to the test device 330 via the test probe 430.

As shown in FIG. 9B, as the test head 410 of the display test apparatus 500 is lifted, the connection probe 440 is separated from the display panel 300 under test while the test probe 430 remains in contact with the display panel 300 under test. In this state, when the connection device 340 is separated from the connection probe 440, there is no signal path therebetween and no signal is transmitted. At this point, it indicates that the display panel 300 has been tested and powering down is about to occur. However, at this time, the test device 330 may still remain in contact with the test probe 430, so that the display test apparatus 500 may transmit the discharge signal to the display panel through the test probe 430 to discharge the residual charges in the pixel units. The position of the test head 410 in this state is the intermediate position.

As shown in FIG. 9C, the test head 410 is located in the second position. At the second position, the connection probe 440 and the test probe 430 are both separated from the display panel. That is, the connection probe 440 is disconnected from the connection device 340 and the test probe 430 is disconnected from the test device 330. At this time, when the display test apparatus 500 is completely separated from the display panel 300, the display panel 300 is powered down, and the test is terminated.

It can be understood that the charges in the pixel electrode of each pixel unit in the display panel are completely released when the test head is in the intermediate position, thereby ensuring that no adverse effects such as a ghost image, grayscale flicker and the like are generated after the display panel is completely powered down (i.e., the test head is in the second position).

Figure 10:
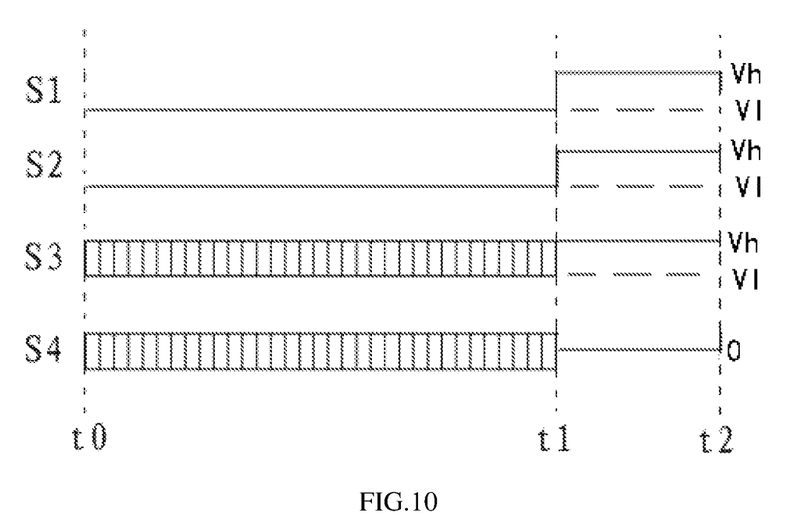
FIG. 10 illustrates a timing diagram of an input signal of a display panel according to an embodiment of the present disclosure.

FIG. 10 illustrates a timing diagram of an input signal when a display panel is tested by using a display test apparatus according to an embodiment of the present disclosure.

From time t0 to time t1, the test head 410 is located in the first position, and the display test apparatus 500 provides the test signal to the display device, specifically, the first signal S1 is supplied to the first test pad P1, the second signal S2 is supplied to the second test pad P2, the third signal S3 is supplied to the third test pad P3, and the fourth signal S4 is supplied to the fourth test pad P4. For example, both the first signal S1 and the second signal S2 remain at a second level. The third signal S3 may be a data switching signal. A data signal is supplied to the data signal lines DL when the third signal S3 is at a first level, and the data signal is not supplied to the data signal lines DL when the third signal S3 is at a second level. The fourth signal S4 may be the data signal. Thus, the display test apparatus may perform a display test on the display panel by progressive scanning. This period of time may represent the test state shown in FIG. 9A.

At time t1, the connection device detects that the display test apparatus is about to be separated from the display panel.

From time t1 to time t2, the first signal S1, the second signal S2, and the third signal S3 are all at the first level, and the fourth signal is at the discharge level, for example a zero level, to release the residual charges in the pixel units of the display panel via the discharge circuit. In conjunction with the discharge circuit of FIG. 6, the first signal S1 is at the first level, and the first transistor T1 is turned on, thereby transmitting the second signal S2 which is at the first level to the control electrode of the pixel driving transistor T3 to turn on the pixel driving transistor T3. The third signal S3 is at the first level to turn on the second transistor T2. The fourth signal S4 is at zero level, so that the residual charges in the pixel electrode PE may be released via the pixel driving transistor T3 and the second transistor T2. This period of time may represent the discharge state shown in FIG. 9B. The damping member provided by the embodiment of the present disclosure may appropriately delay the period of time to perform sufficient discharge.

After time t2, the display test apparatus is completely separated from the display panel, and each of signals is zero. This is the power-down state shown in FIG. 9C.

The embodiment of the present disclosure has been described by taking an example in which the first transistor T1, the second transistor T2, and the pixel driving transistor T3 are all N-type transistors. The first level is a high level Vh, for example, +8V, and the second level is a low level V1, such as −8V. In addition, at least one of the first transistor T1, the second transistor T2, and the pixel driving transistor T3 may also adopt a P-type transistor, and the first level and the second level may be adaptively adjusted accordingly which will not be described in detail herein.

Figure 11:
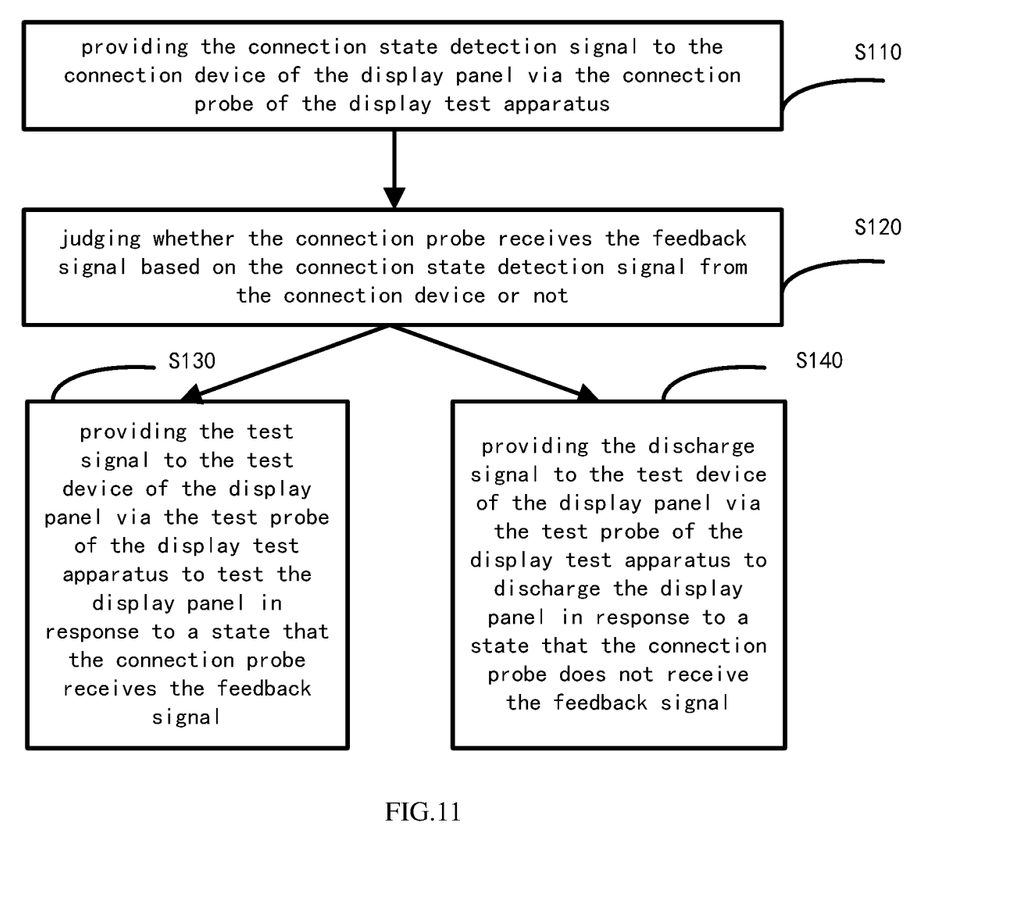
FIG. 11 shows a flow chart of a method of testing a display panel using a display test apparatus according to an embodiment of the present disclosure.

FIG. 11 shows a flow chart of a method of testing a display panel using a display test apparatus according to an embodiment of the present disclosure.

As shown in FIG. 11, in step S110, a connection state detection signal is supplied to the connection device of the display panel from the display test apparatus. In step S120, it is determined whether the display test apparatus receives a feedback signal from the connection device or not. In step S130, when it is determined that the display test apparatus receives the feedback signal, the test signal is provided to the test device of the display panel via the test probe of the display test apparatus to test the display panel. In step S140, when it is determined that the display test apparatus does not receive the feedback signal, the discharge signal is provided to the test device of the display panel via the test probe of the display test apparatus to discharge the display panel.

In some embodiments of the present disclosure, discharging the display panel includes: providing a first signal S1 to the first test pad P1, providing a second signal S2 to the second test pad P2, and providing a third signal S3 to the third test pad P3, providing a fourth signal S4, such as a discharge level, to the fourth test pad P4. Specifically, the first signal S1 turns on the first transistor T1 to supply the second signal S2 to the control electrode of the pixel driving transistor T3, so that the pixel driving transistor T3 is turned on, at the same time the third signal S3 turns on the second transistor to provide the discharge level to the pixel electrode of the pixel unit.

As described above, the display panel and the display test apparatus provided by the embodiments of the present disclosure may activate the discharge circuit to release the residual charges remaining in the pixel electrode of the pixel unit in time by quickly detecting whether or not the display panel and the display test apparatus are about to be separated, thereby preventing defects, such as a ghost image and grayscale flicker and the like, caused by sudden power loss during the test of the liquid crystal cell.

Several embodiments of the present disclosure have been described in detail above, but the scope of protection of the present disclosure is not limited thereto. It will be apparent to those skilled in the art that various modifications, substitutions and changes may be made to the embodiments of the present disclosure without departing from the spirit and scope of the disclosure. The scope of protection of the disclosure is defined by the appended claims.

What is claimed is:

1. A display panel comprising:
   an array substrate;
   a test device disposed on the array substrate and configured to receive a test signal from a display test apparatus to test a plurality of pixel units of the display panel; and
   a connection device disposed on the array substrate and configured to be electrically connectable to the display test apparatus,
   wherein the test device is configured to receive a discharge signal from the display test apparatus to discharge the plurality of pixel units in response to a switch of a connection state between the connection device and the display test apparatus from electrical connection to electrical disconnection, and
   wherein the connection device comprises:
      a first connection pad configured to receive a connection state detection signal from the display test apparatus;
      a second connection pad configured to transmit a feedback signal based on the connection state detection signal to the display test apparatus; and
      a conductive member electrically coupling the first connection pad to the second connection pad.

2. The display panel according to claim 1, wherein the array substrate comprises:
   a base substrate;
   a first insulating layer on the base substrate;
   a first conductive layer on the first insulating layer; and
   a second insulating layer on the first conductive layer, the second insulating layer having a first opening and a second opening exposing the first conductive layer,
   wherein the first connection pad is located on the second insulation layer and connected to the first conductive layer via the first opening, and the second connection pad is located on the second insulation layer and connected to the first conductive layer via the second opening, and
   wherein the conductive member comprises a portion of the first conductive layer between the first connection pad and the second connection pad.

3. The display panel according to claim 1, wherein the test device comprises: a first test pad, a second test pad, a third test pad, and a fourth test pad; and
   wherein the array substrate comprises:
      a plurality of pixel electrodes arranged in an array and located in the plurality of pixel units respectively;
      a plurality of pixel driving transistors in one-to-one correspondence with the plurality of pixel electrodes, a first electrode of each of the pixel driving transistors being electrically connected to one of the pixel electrodes;
      a plurality of scanning signal lines, each of the scanning signal lines being electrically connected to a plurality of control electrodes of the pixel driving transistors for one row of pixel electrodes;
      a plurality of data signal lines, each of the data signal lines being connected to a plurality of second electrodes of the pixel driving transistors for one column of pixel electrodes;
      a plurality of first transistors in one-to-one correspondence with the plurality of scanning signal lines, each of control electrodes of the first transistors being connected to the first test pad, and each of first electrodes of the first transistors being connected to the second test pad, and each of second electrodes of the first transistors being connected to one of the scanning signal lines; and
      a plurality of second transistors in one-to-one correspondence with the plurality of data signal lines, each of control electrodes of the second transistors being connected to the third test pad, and each of first electrodes of the second transistors being connected to the fourth test pad, and each of second electrodes of the second transistors being connected to one of the data signal lines.

4. The display panel according to claim 3, wherein, in response to the switch of the connection state between the connection device and the display test apparatus from electrical connection to electrical disconnection, the discharge signal sets the first test pad, the second test pad, and the third test pad to a first level so that the first transistors, the second transistors, and the pixel driving transistors are all in an on state, and the discharge signal sets the fourth test pad to a discharge level to provide the discharge level to the plurality of pixel electrodes.

5. The display panel according to claim 1, wherein at least one of the first connection pad and the second connection pad serves as an alignment mark of the array substrate.

* * * * *